(12) United States Patent
Heise

(10) Patent No.: US 11,512,502 B2
(45) Date of Patent: Nov. 29, 2022

(54) ATTACHMENT DEVICE

(71) Applicant: Stefan Heise, Brønshøj (DK)

(72) Inventor: Stefan Heise, Brønshøj (DK)

(73) Assignee: GN AUDIO A/S, Ballerup (DK)

( * ) Notice: Subject to any disclaimer, the term of this patent is extended or adjusted under 35 U.S.C. 154(b) by 610 days.

(21) Appl. No.: 16/493,747

(22) PCT Filed: Apr. 20, 2018

(86) PCT No.: PCT/EP2018/060193
§ 371 (c)(1),
(2) Date: Sep. 12, 2019

(87) PCT Pub. No.: WO2018/197361
PCT Pub. Date: Nov. 1, 2018

(65) Prior Publication Data
US 2020/0080345 A1 Mar. 12, 2020

(30) Foreign Application Priority Data

Apr. 28, 2017 (DK) .............................. PA201700270
Jul. 6, 2017 (DK) .............................. PA201700403

(51) Int. Cl.
*E05B 73/00* (2006.01)
*G06F 21/88* (2013.01)
*E05B 67/38* (2006.01)

(52) U.S. Cl.
CPC .......... *E05B 73/0082* (2013.01); *E05B 67/38* (2013.01); *E05B 73/00* (2013.01); *G06F 21/88* (2013.01)

(58) Field of Classification Search
CPC ........ E05B 67/38; E05B 67/383; E05B 73/00; E05B 73/0017; E05B 73/0035; E05B 73/0041; E05B 73/0082; G06F 21/88
See application file for complete search history.

(56) References Cited

U.S. PATENT DOCUMENTS 1,427,285 A * 8/1922 Goehner ............... B60R 25/005
70/203
2,746,112 A * 5/1956 Simon ...................... H02G 3/32
24/457

(Continued)

FOREIGN PATENT DOCUMENTS

CN 101415902 A 4/2009
CN 102079191 A 6/2011

(Continued)

OTHER PUBLICATIONS

Written Opinion/International Search Report for international patent application No. PCT/EP2018/060193 dated Jul. 18, 2018.

(Continued)

*Primary Examiner* — Christopher J Boswell
(74) *Attorney, Agent, or Firm* — Hamre, Schumann, Mueller & Larson, P.C.

(57) ABSTRACT

An attachment device (1) for an apparatus (10), which apparatus (10) comprises a fixed cable (2) with a connector (12) at its free end. The attachment device (1) comprises a first plate member (3) and a second plate member (4), which by means of a hinge member (7) are rotatably connected to each other about a hinge axis (5). Hereby, they can rotate between a closed position, in which the plate members (3, 4) lie against each other, and in which the attachment device (1) defines a through-going opening (6) for the cable (2), and an open position, in which the cable (2) can be removed from the attachment device (1). The first plate member (3) comprises a first locking slot (83) and the second plate member (4) comprises a second locking slot (84). The first and second locking slots (83, 84) are aligned in the closed position, whereby a locking member (13) can be inserted through both locking slots (83, 84) and lock the attachment device (2) in the closed position, in which the cable (2) cannot be out pulled through the through-going opening (6).

(Continued)

The hinge axis (5) is parallel with the first and second plate members (3, 4) and that the through-going opening (6) is tubular.

7 Claims, 3 Drawing Sheets

(56) References Cited

U.S. PATENT DOCUMENTS

| | | | |
|---|---|---|---|
| 3,015,140 A | | 1/1962 | Pender, Sr. |
| 4,286,444 A | * | 9/1981 | Grudich ............... E05B 67/383 |
| | | | 70/6 |
| 5,816,081 A | * | 10/1998 | Johnston ............. E05B 73/0005 |
| | | | 70/164 |
| 6,038,891 A | * | 3/2000 | Zeren ................. E05B 73/0005 |
| | | | 70/58 |
| 6,053,016 A | | 4/2000 | Young |
| 6,092,402 A | | 7/2000 | Porcelli |
| 6,233,791 B1 | * | 5/2001 | Theis .................... F16L 3/1218 |
| | | | 24/135 R |
| 6,505,487 B1 | | 2/2003 | Garel |
| 6,598,433 B1 | * | 7/2003 | Malvasio ................ E05B 73/00 |
| | | | 70/59 |
| 6,622,532 B2 | * | 9/2003 | Hsu ..................... E05B 73/0082 |
| | | | 248/316.4 |
| 7,111,479 B2 | * | 9/2006 | Murray, Jr. ......... E05B 73/0082 |
| | | | 70/58 |
| 7,377,136 B1 | * | 5/2008 | DeMartinis ......... E05B 73/0005 |
| | | | 70/58 |
| 8,042,365 B2 | * | 10/2011 | Morrison ............ E05B 73/0082 |
| | | | 70/58 |
| 2008/0034817 A1 | | 2/2008 | Chan |
| 2010/0269552 A1 | | 10/2010 | Morrison |

FOREIGN PATENT DOCUMENTS

| | | |
|---|---|---|
| DE | 69500720 T2 | 4/1998 |
| DE | 10221233 A1 | 11/2003 |
| EP | 2843165 | 3/2015 |
| EP | 3037610 | 6/2016 |
| GB | 2289112 B | 8/1997 |
| JP | H0814442 A | 1/1996 |
| JP | H11344158 A | 12/1999 |

OTHER PUBLICATIONS

Search Report issued in corresponding Chinese application No. 20188017012.

* cited by examiner

ATTACHMENT DEVICE

TECHNICAL FIELD

The invention relates to an attachment device for an apparatus, which apparatus comprises a fixed cable with a connector at its free end, the attachment device comprises a first plate member and a second plate member, which by means of a hinge member are rotatably connected to each other about a hinge axis, whereby they can rotate between a closed position, in which the plate members lie against each other, and in which the attachment device defines a through-going opening for the cable, and an open position, in which the cable can be removed from the attachment device, and where the first plate member comprises a first locking slot and the second plate member comprises a second locking slot, wherein the first and second locking slots are aligned in the closed position, whereby a locking member can be inserted through both locking slots and lock the attachment device in the closed position, in which the cable cannot be out pulled through the through-going opening.

BACKGROUND ART

Attachment devices of the above art are also referred to as anti-theft devices and are used for preventing stealing or just removal of small or portable electronics equipment such as laptops, computer monitors, speakerphones etc. from f. ex. meeting rooms or office desks, to which multiple people have access. For this purpose, many of these products today are provided with a so-called Kensington Security Slot, which is small, often metal-reinforced hole, which can receive a metal anchor of a key or combination lock that is connected to a wire. The wire has a loop and can be looped around a fixed object, such as furniture. The Kensington slot is 7 mm long and 3 mm wide, and I can be difficult to provide small devices with such a slot, especially because the relatively large lock may hamper the usability or appearance of such small devices.

In order to secure devices with no Kensington® slot, attachment devices such as CableSaver™ have been developed. This attachment device is a scissor-like construction, which comprises two hinged plate-like metal parts, which can rotate between an open position, in which one or more cables can be placed between the plate-like parts, and a closed position in which the cables are encircled by cut-outs in the edges of the plate-like parts. In the closed position, the device can be locked by inserting and locking the anchor of a Kensington® lock through aligned Kensington® slots in the two plate-like parts. A disadvantage with this device is that the relatively sharp edges of the cut-outs of the plate parts may exert strain on and wear the cables and in worst case cause a 180 degrees bend of the cable.

DISCLOSURE OF INVENTION

The object of the invention is to provide an improved attachment device. The attachment device according to the invention is characterised in that, the rotational axis is parallel with the first and second plate parts and that the through-going opening is tubular. With such a device the cable will be exposed to less strain.

The through-going opening may have a longitudinal axis, which is parallel with the hinge axis.

According to an embodiment, the first plate member comprises a first rubber plate part and the second plate member comprises a second rubber plate part, wherein the first and second rubber plate parts are formed in one piece with the hinge member.

According to an embodiment, an inner side of the first rubber plate part lie against an inner side of the second rubber plate part in the closed position, wherein the first plate member comprises a first rigid plate part on the opposite, outer side of the first rubber plate part and the second plate member comprises a second rigid plate part on the opposite, outer side of the second rubber plate part. The rigid plate parts improve the stiffness of the attachment device, whereby it is more difficult to pull the locking member out of the locking slots without unlocking the locking device of the locking member The rigid plate parts may be made of metal.

The first rigid plate part may be encircled by a first rubber edge part, and the second rigid plate part may be encircled by a second rubber edge part. Thus, the edges may not scratch the table surface or make noise when drawn across the table surface.

According to an embodiment, the rigid plate parts have a thickness of at least 0.8 mm.

According to an embodiment, the hinge member encircles the through-going opening in the closed position.

According to an embodiment, the through-going opening has a length of at least 10 mm, 15 mm or 20 mm. This decreases long-term wearing of the cable, which the attachment device is mounted about.

According to an embodiment, the through-going hole has an essentially circular cross-section with a diameter of 2 to 6 mm. Thus, the attachment device is suitable for cable diameters of 2 to 6 mm.

According to an embodiment, the locking slots are 7 mm long, 3 mm wide and have corner radiuses of maximum 1 mm. Thus, the attachment device is adapted to the Kensington® lock devices.

The sum of the thicknesses of the plate parts is preferably 2.50 to 4.00 mm. This is the dimensions, the Kensington® lock devices are designed for.

BRIEF DESCRIPTION OF THE DRAWINGS

The invention is explained in detail below with reference to the drawing illustrating a preferred embodiment of the invention and in which.

MODES FOR CARRYING OUT THE INVENTION

Figure 1:
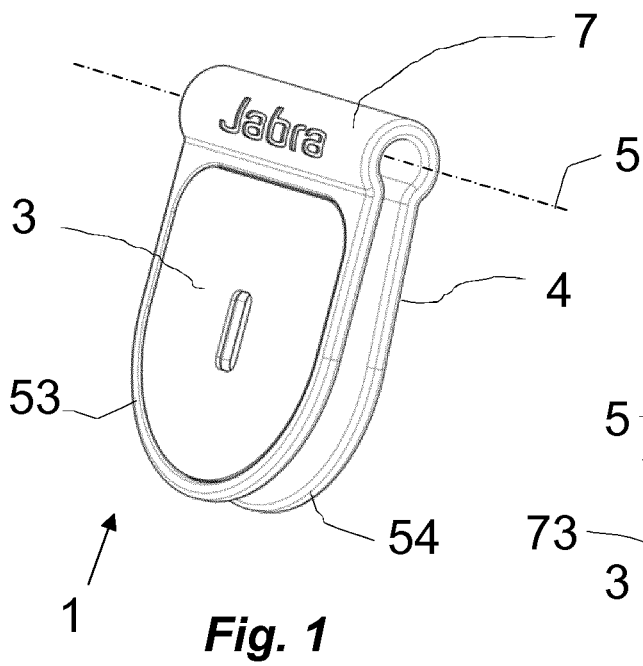
FIG. 1 is a perspective view of a preferred embodiment of an attachment device according to the invention.
Figure 2:
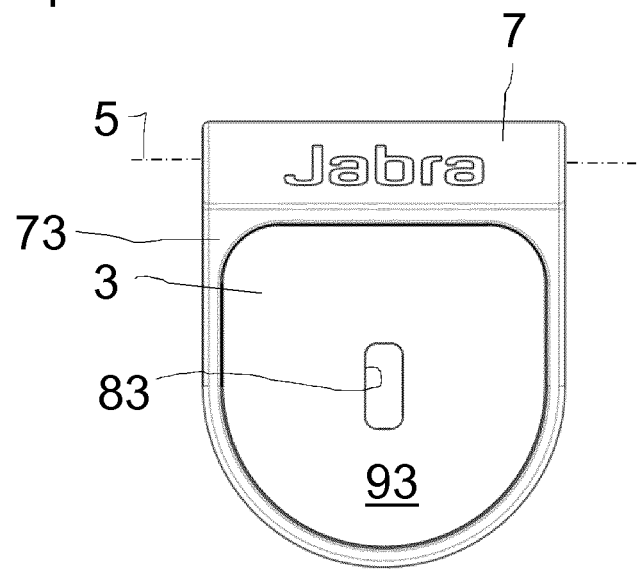
FIG. 2 is a front view of the attachment device.
Figure 3:
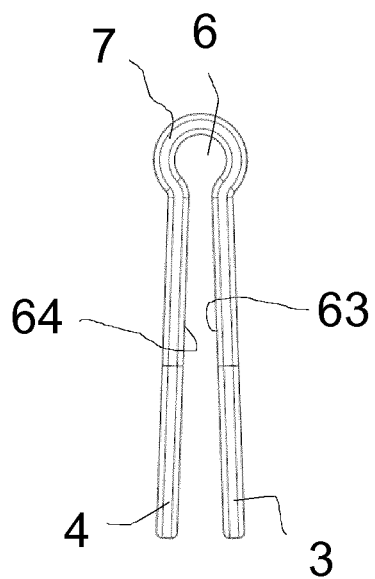
FIG. 3 is a side view of the attachment device.
Figure 4:
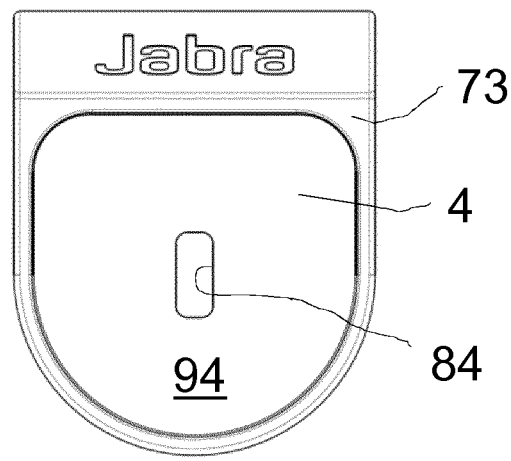
FIG. 4 is a back view of the attachment device.

FIGS. 1-5 are line drawings of a first embodiment of an attachment device 1 according to the invention shown from different angles. FIG. 1 is showing the attachment device 1 in a perspective view. The attachment device 1 comprises a first plate member 3, a second plate member 4 and a hinge member 7 interconnecting the first and second plate members 3, 4. As indicated in FIG. 2, the first plate member 3 comprises a rubber plate part 73 and a first rigid plate part 93. Likewise, as indicated in FIG. 4, the second plate member 4 comprises a second rubber plate part 74 and a second rigid plate part 94. The hinge member 7 comprises a flexible slitted tubular rubber part 7 with a through-going bore 6 and with a hinge axis 5 extending in the longitudinal direction of the tubular rubber part 7 approximately at the centre of the bore 6. The flexible tubular rubber part 7 and the first and second rubber plate parts 73, 74 together form a uniform rubber body. The first rigid plate part 93 is attached in a recess in the outer side of the first rubber plate part 73. Likewise, the second rigid plate part 94 is attached in a recess in the outer side of the second rubber plate part 74. Thus, the first rigid plate part 93 is encircled by a first rubber edge part 53, and the second rigid plate part 94 is encircled by a second rubber edge part 54. The first and second rigid plate parts 93, 94 are made of 0.8 mm thick stainless steel sheet.

The first and second plate members 3, 4 are provided with through-going Kensington® slots 83, 84. Thus, the Kensington® slots extends through both the first and second rubber plate parts 73, 74 and the first and second rigid plate parts 93, 94. In a closed position, where inner sides 63, 64 of the first and second plate members lie against each other, the Kensington® slots are aligned.

FIG. 2 is a front view, showing the outer side of the first plate member 3 and the hinge member 7. FIG. 3 is a side view of the attachment device 1 in an open position. FIG. 4 is a back view of the attachment device 1, where the outer side of the second plate member 4 and the hinge member 7 is visible. The attachment device 1 is symmetric about a plane extending between the first and second plate members 3, 4, whereby the views of FIGS. 2 and 4 are identical.

Figure 5:
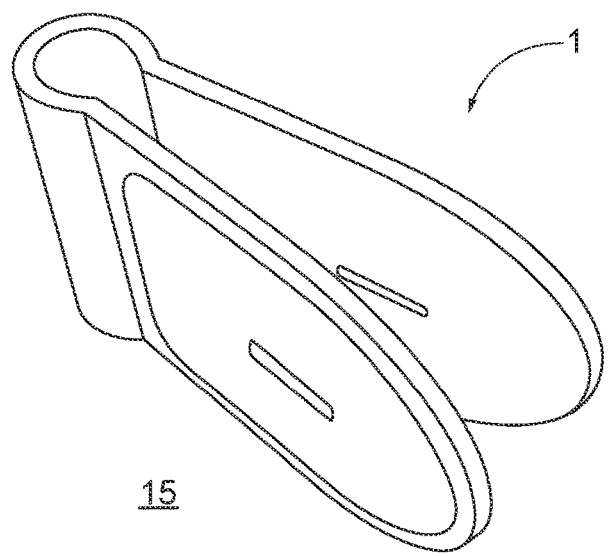
FIG. 5 is a photo of the attachment device in an open position.

FIG. 5 is a photo showing the attachment device 1 lying on a table surface 15 in an open position ready to receive a cable from a device to be attached. Due to the flexible material of the rubber part 7, the first and second plate members 3, 4 can be rotated against and away from each other about the hinge axis 5, whereby it is possible to arrange a cable in the bore 6 of the hinge part 7. After a cable insertion, the plate members 3, 4 cab be rotated back against each other to a closed position. In the closed the position, the rubber material of the inner sides 63, 64 of the first and second plate members 3, 4 lie against each other. In the closed position, the slit of the bore 6 is closed, whereby the cable 2 cannot escape.

Figure 6:
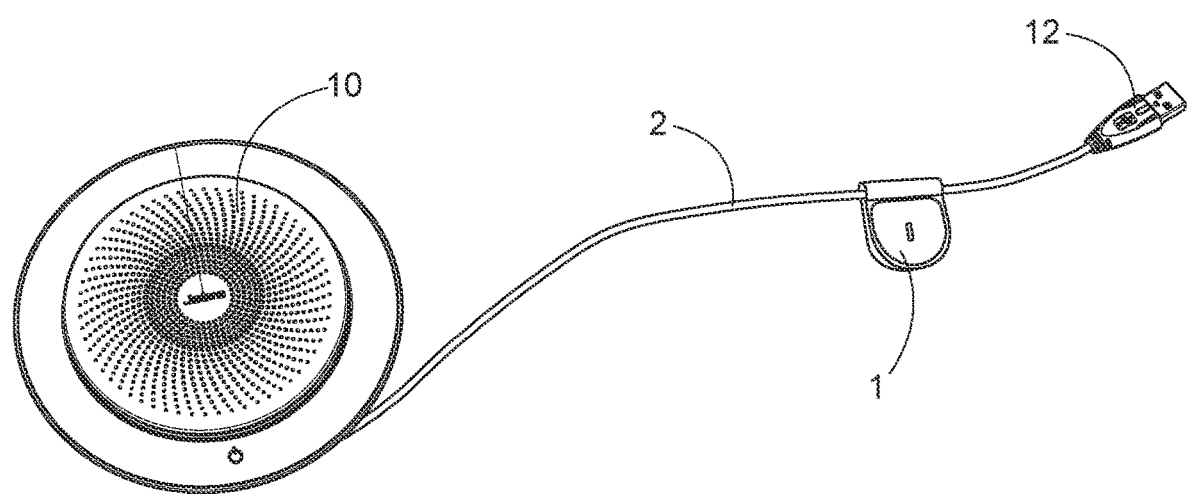
FIG. 6 is a photo of an the attachment device arranged around a cable of a speakerphone.

In FIG. 6, the attachment device 1 is arranged on a cable 2 with the cable 2 extending through the bore 6 of the hinge member 7.

Figure 7:
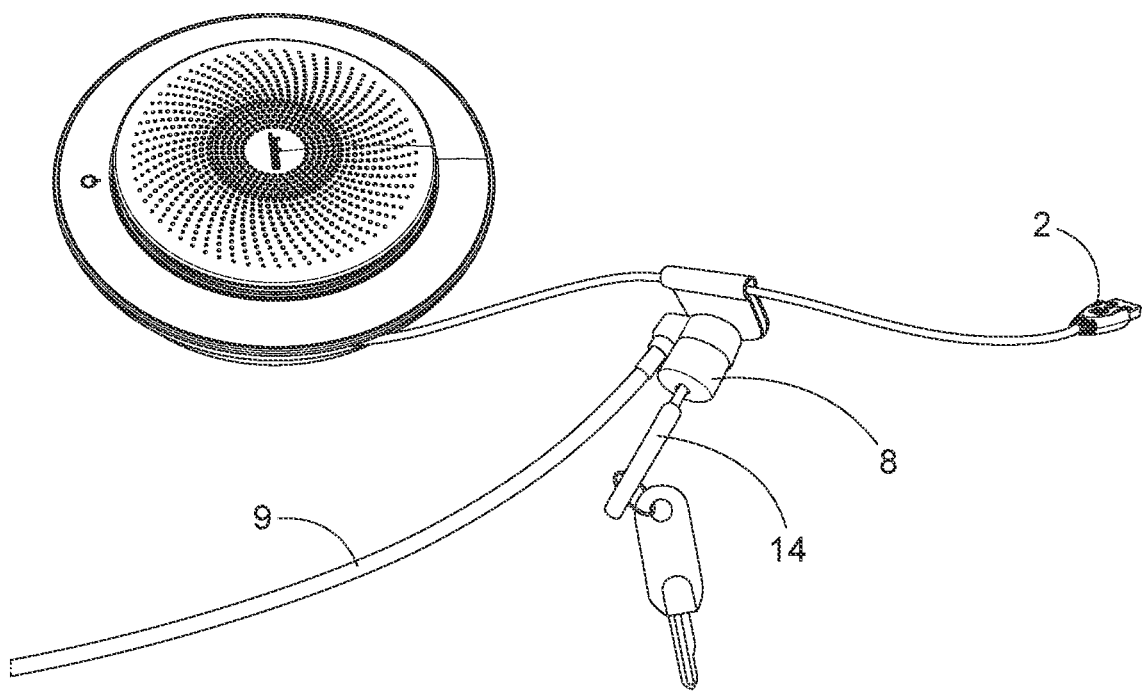
FIG. 7 is a photo showing a Kensington® lock locked to the attachment device.
Figure 8:
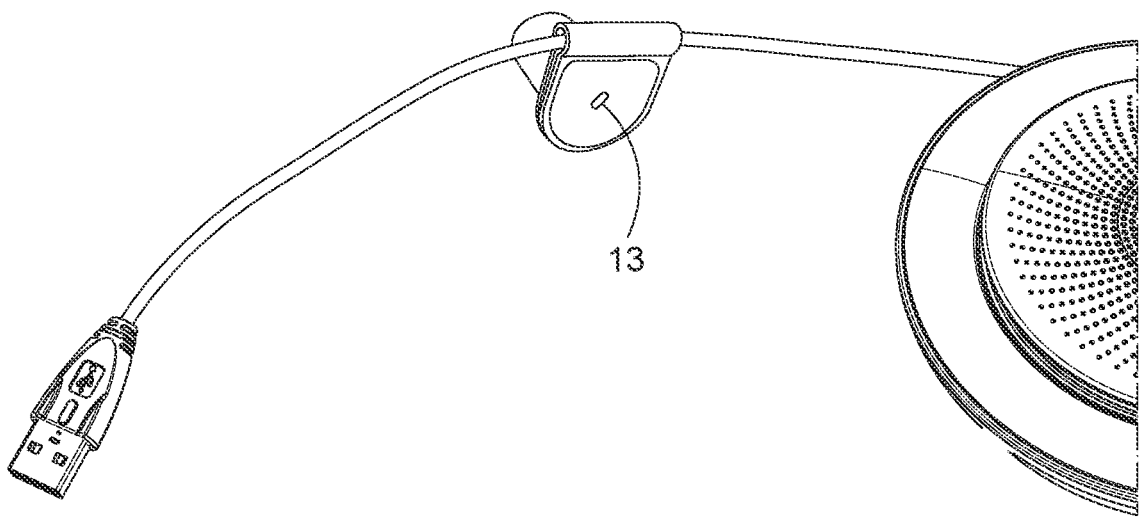
FIG. 8 is a photo showing a Kensington® lock locked to the attachment device from a different angle.

In FIG. 7, a keyed Kensington® lock 8 is attached to the attachment device 1. As shown in FIG. 8, a T-bar™ 13 is inserted through the aligned Kensington slots 83, 84 and rotated 90 degrees by means of the key 14. Hereby, the Kensington® lock and the attachment device 1 are locked together and cannot be separated without the key 14. In this position, it is not possible to detach the attachment device 1 from the speakerphone 10, as the first end of the speakerphone cable 2 is permanently fixed to the speakerphone 10, and the other end comprises a USB plug 12, which is too large to pass through the bore 6 of the attachment device 1. The Kensington Lock® comprises a metal wire 9. One end of the metal wire 9 is attached to the locking part of the Kensington Lock® 8. The other end, which is not visible here, of the wire 9 comprises a loop, and by means of this the wire 9 is looped around a fixed part such as a table leg. Thus, the speakerphone 10 cannot be removed from the table without destroying the lock 8, the cable 2 or the attachment device 1.

The attachment device 1 is dimensioned to be used with Kensington® locking devices. Therefore, the slots are 7 mm to 7.25 mm long and 3 mm to 3.25 mm wide. The corners of the slots have a radius of 1 mm. The total thickness of the first and second plate members together is 2.50 mm to 4.00 mm. The rigid plate parts 93, 94 of stainless steel are 0.8 mm thick. The rigid plate parts 93, 94 are approximately 27 mm wide, measured in the direction of the hinge axis 5, and 27 mm in the direction orthogonal hereto.

The length of the hinge part 7 is the same as the width of the first and second plate members 3, 4 and is about 30 mm.

The bore 6 has a diameter of approximately 4 mm.

The rigid plats parts 93, 94 of stainless steel ensure an efficient interlocking with the Kensington® lock. The outer edges of rubber reduces the risk of the attachment device making marks in the surface 15 of the table and also reduces noise due to contact between the attachment device 1 and the table surface 15 if the speakerphone 10 or other device is moved. This is especially relevant if the speakerphone 10 is moved in the middle of a conference call, as noise is distracting for the conference call participants who receive sound from the speakerphones 10 microphone.

The invention is not limited to the embodiment disclosed here. The attachment device 1 can be of other materials, such as plastic or metal. It can also have different shapes.

The attachment device according to the invention is not limited to be used with Kensington® locks. Thus, locking slots 83, 84 with other dimensions can be provided.

The attachment device 1 according to the invention can also be used to lock a cable alone, if the cable has connector in both ends, which are too big to pass through the bore 6 in the closed position of the attachment device 1.

REFERENCE SIGNS 1 attachment device
2 cable
3 first plate member
4 second plate member
5 hinge axis
6 bore
7 hinge member
8 Kensington® locking device
9 metal wire
10 speakerphone
11 metal anchor
12 USB connector
13 Locking member/T-bar™
14 Key
15 table surface
53 edge part of first plate member
54 edge part of second plate member
63 inner side of first plate member
64 inner side of second plate member
73 first rubber plate part
74 second rubber plate part
83 first locking slot
84 second locking slot
93 first rigid plate part
94 second plate part

The invention claimed is:

1. An attachment device for an apparatus, which apparatus comprises a fixed cable with a connector at its free end, the attachment device comprises a first plate member and a second plate member, which by means of a hinge member are rotatably connected to each other about a hinge axis, whereby they can rotate between a closed position, in which the plate members lie against each other, and in which the attachment device defines a through-going opening for the cable, and an open position, in which the cable can be removed from the attachment device, and where the first plate member comprises a first locking slot and the second plate member comprises a second locking slot, wherein the first and second locking slots, are aligned in the closed position, whereby a locking member can be inserted through both locking slots and lock the attachment device in the closed positon, in which the cable cannot be out pulled through the through-going opening, wherein, the hinge axis is parallel with the first and second plate members and that the through-going opening is tubular; and wherein the first plate member includes a first rubber plate part and the second plate member includes a second rubber plate part; wherein the first and second rubber plate parts are formed in one piece with the hinge member; and wherein an inner side of the first rubber plate part lies against an inner side of the second rubber plate part in the closed position; and wherein the first plate member includes a first rigid plate part on the opposite, outer side of the first rubber plate part; and the second plate member includes a second rigid plate part on the opposite, outer side of the second rubber plate part; and wherein the first rigid plate part is encircled by a first rubber edge part and the second rigid plate part is encircled by a second rubber edge part.

2. An attachment device according to claim 1, wherein the through-going opening has a longitudinal axis which is parallel with the hinge axis.

3. An attachment device according to claim 2, wherein the rigid plate parts are made of metal.

4. An attachment device according to claim 3, wherein the rigid plate parts have a thickness of at least 0.8 mm.

5. An attachment device according to claim 4, wherein the hinge member encircles the through-going opening in the closed position.

6. An attachment device according to claim 5, wherein the through-going opening has a length of at least 10 mm, 15 mm or 20 mm.

7. An attachment device according to claim 6 wherein the through-going hole has an essentially circular cross-section with a diameter of 2 to 6 mm.

* * * * *